Sept. 27, 1966     C. M. HAWKINS ET AL     3,274,772
CONTINUOUSLY STAGED ROCKET CONSTRUCTION
Filed July 16, 1963     2 Sheets-Sheet 2

INVENTORS
Cyril M. Hawkins &
BY Albert J. Sobey
Paul Fitzpatrick
ATTORNEY

United States Patent Office 3,274,772
Patented Sept. 27, 1966

3,274,772
CONTINUOUSLY STAGED ROCKET
CONSTRUCTION
Cyril M. Hawkins, Indianapolis, Ind., and Albert J. Sobey, Birmingham, Mich., assignors to General Motors Corporation, Detroit, Mich., a corporation of Delaware
Filed July 16, 1963, Ser. No. 295,429
5 Claims. (Cl. 60—225)

This invention relates to solid propellant rocket engines and, more particularly, to a multi-stage solid propellant rocket engine comprising a plurality of stage units wherein each succeeding stage ignites the next stage as it nears burn-out and then explosively separates itself from the next stage. This is accomplished through the use of unique stage separation and stage ignition systems and an annular exhaust nozzle in each stage unit.

Known multi-stage solid propellant rocket engines usually comprise three stages, the size and resultant thrust of which vary according to the engine characteristics desired. Each of these rocket engines then must be built according to the individual requirements for the mission in which the particular rocket is to be used. Thus, the degree of interchangeability among stages of rocket engines has been low due to the varying sizes and combinations needed.

Due to the current widespread use of rocket engines both in the exploration of space and in military defense, it has become apparent that there is a need for a method to construct these rocket engines out of a group of standardized stage units. Thus, this invention presents a system whereby a plurality of varying sizes of a basic rocket stage unit may be produced in quantity and varying combinations thereof may be put together to construct varying size rocket engines to fit all requirements of their present day use.

In general, in its preferred embodiment this invention provides a series of rocket engine stage units which are identical in operation and in many structural details and yet vary in size and thrust output such that they can be put together in varying combinations to result in rocket engines of varying size and output. Each of these stage units contains its own solid propellant mass and is equipped with its own annular exhaust nozzle. These stage units are constructed so that they are attached to adjacent stage units by means that are explosively removable, such that the stages separate upon the actuation of these explosive means. Thus, this invention involves a compact stage unit which in effect is an individual rocket engine, but which may be put together with several like stages to produce a multi-stage rocket engine. As mentioned previously, these stage units will vary in size and thrust output such that varying combinations can be produced to result in a variety of different multi-stage rocket engines. Not unlike toy building blocks for infants, a known number of varying size units can be produced in quantity and combined in any desired manner. Thus, for example, ten different size stage units could be produced and a plurality of different combinations of the stage units could be added to produce rocket engines for different desired results. In other words, stage units numbered 1, 2 and could be put together for a small three-stage rocket engine or stage units 8, 9 and 10 could be put together for a large three-stage rocket engine, assuming stage 1 is the smallest and stage 10 the largest of the given set of 10 stage units. It should then be obvious that the invention presents a broad plan for standardizing the production of current multi-stage rocket engines and missiles. This is made possible through the use of new and novel stage separation and ignition systems and a unique annular exhaust nozzle in each stage.

It is therefore an object of this invention to provide heat-responsive ignition and stage separation means for a stage unit in a multi-stage rocket engine.

It is a further object of this invention to provide an annular nozzle for a rocket engine stage unit, the throat area of which can be adjusted at assembly to alter the thrust level and compensate for grain temperature.

It is still a further object of this invention to present a compact rocket engine stage unit which can be built in varying sizes and which can be combined in varying ways to produce a multitude of different multi-stage rocket engines which will fulfill the need for the current uses of rockets and missiles for space exploration and for military defense.

It is another object of this invention to provide a rocket engine stage unit which is an efficient rocket engine by itself and which when combined with like stage units will ignite the succeeding adjacent stage and explosively disconnect itself from the succeeding stage.

Other objects, features and advantages of the present invention will become obvious upon reference to the succeeding detailed description and the drawing disclosing the preferred embodiment thereof, wherein.

Figure 3:
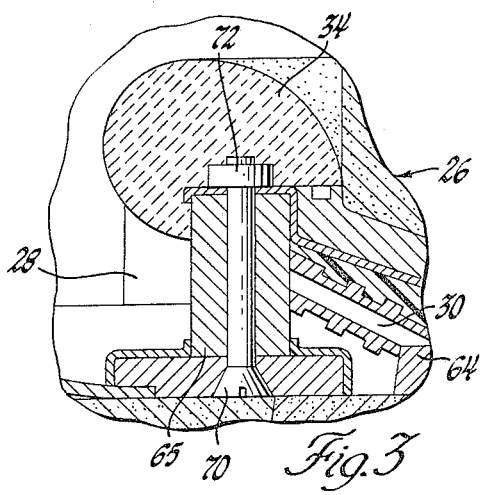
FIGURE 3 is an enlarged sectional view of the nozzle construction.

More particularly, the drawings show a rocket engine stage unit 10 connected to adjacent like stage units 12 and 14. It is to be noted that as mentioned previously this stage unit 10 may be any one of a number of such stage units, which vary in size and thrust output, in a multi-stage rocket engine. The stage unit 10 is housed within a cylindrical or tapering steel casing 16, which is adapted to join the stage unit 10 to an adjacent stage unit. An annular ring of solid propellant 18 lies directly against the inside wall of the cylindrical casing 16. Another annular ring of solid propellant 20 is located around a central tube 22 which defines a heat passage. Located between the annular propellant ring 18 and the inner annular propellant ring 20 is an annular gas passage 24 which communicates with an exhaust nozzle 26. The exhaust nozzle 26 is comprised of a converging annular inlet 28, a throat 30, and a diverging exit due to flow over a central cone 32. An annular ring 34 of refractory material, such as tungsten, comprises the wall portion of the entrance to the nozzle 26. It is to be noted that the exhaust nozzle 26 is annular and that the parts thereof also are of an annular form. The exhaust nozzle 26 is held in place by spacers 65 and bolts 70 with their coresponding nuts 72. This two-piece bolted construction permits the selection of a desired throat area at assembly. Since the nozzle is annular, a small change in throat width results in a large change in nozzle throat area. This variation of the throat area at assembly enables the alteration of the thrust level of the stage unit and also facilitates compensation for varying temperatures of different propellant grains used. The details of the exhaust nozzle 26 can best be seen in FIGURE 3, and it is to be noted that the size of the spacers 65 determines the space between the two pieces of the nozzle, thereby controlling the effective nozzle throat area. The annular design of this nozzle construction also provides the best volumetric efficiency by permitting the maximum propellant for a given volume.

Figure 1:
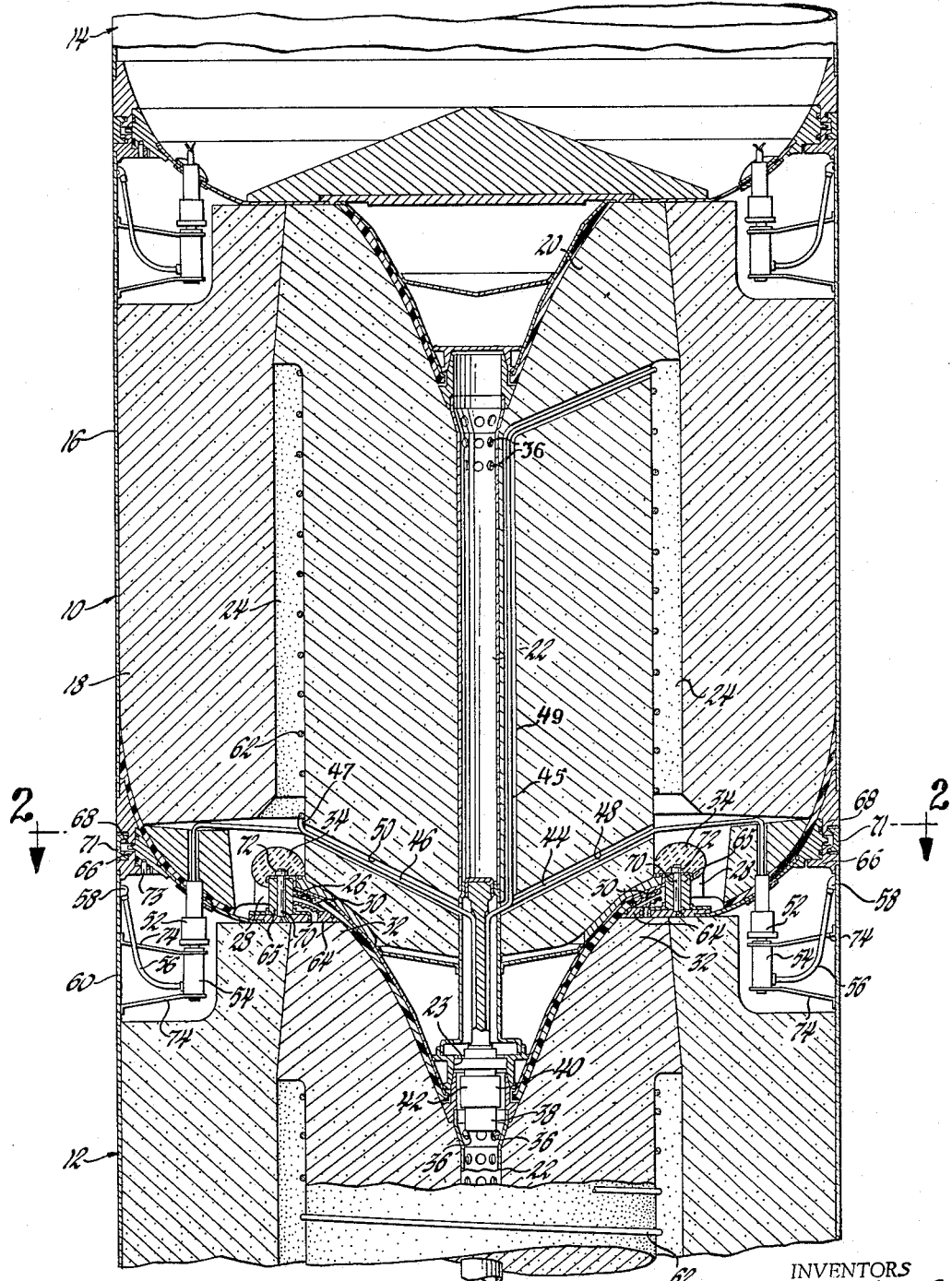
FIGURE 1 shows a rocket engine stage unit in section and portions of adjacent stage units with which it may be combined to produce a multi-stage rocket engine.

We may now consider the ignition and stage separation structure. The stage unit 12 has two annular rings of propellant and a central heat passage like those in stage unit 10. Tube 22 pilots at its upper end into a socket 23 within the nozzle cone 32. The central heat passage is open to the solid propellant through vents 36. These vents allow the entrance of heat into the heat passage 22 upon the burning of the solid propellant. The tube 22 of stage 12 encloses a thermal initiator device 38, which is part of the stage unit 10. This thermal initiator 38 is a powder filled metal case. The powder is of a composition that will explode rather than decompose when heated. Located directly adjacent to the thermal initiator 38 are four end primers, 40, 41, 42, and 43 the pair 41 and 43 of which are directly behind the pair 40 and 42 shown in FIGURE 1. These end primers will be percussion caps which are shock sensitive in the manner of a dynamite cap. Extending from the end primers 40 and 42 are mild detonating fuses 44 and 46, which lead to the stage separating mechanisms. The mild detonating devices 44 and 46 are seen to be protected by conduits 48 and 50 as they pass through the inner propellant ring 20 of stage unit 10. These conduits 48 and 50 will be made of any suitable heat resistant material.

The aforementioned stage separating mechanism comprises a heat initiator 52, an end primer 54, another length of mild detonating fuse 56 and a ring of explosive charge 58. It is to be noted that this ring of charge 58 is located adjacent to a thin portion of the wall 60 of stage unit 12. Thus, when the combustion process of propellant mass of stage unit 12 nears completion, heat enters through the openings 36 of the heat passage 23 and heats the thermal initiator 38, which in turn sets off the end primers 40 and 42. The end primers then ignite the fuses 44 and 46 which burn out to the thermal initiators 52. Upon heating of the thermal initiators 52, the end primers 54 explode and ignite the fuses 56 which in turn explode the charge 58 and disintegrate the casing 60 of the stage unit 12. The stage unit 12 will then fall away from the stage 10 and, in so doing, it leaves stage 10 in position to begin operation. This compound train of explosive devices is necessary for ease of assembly. As will be explained later, different components of this combination reside in the adjacent stage units.

Figure 2:
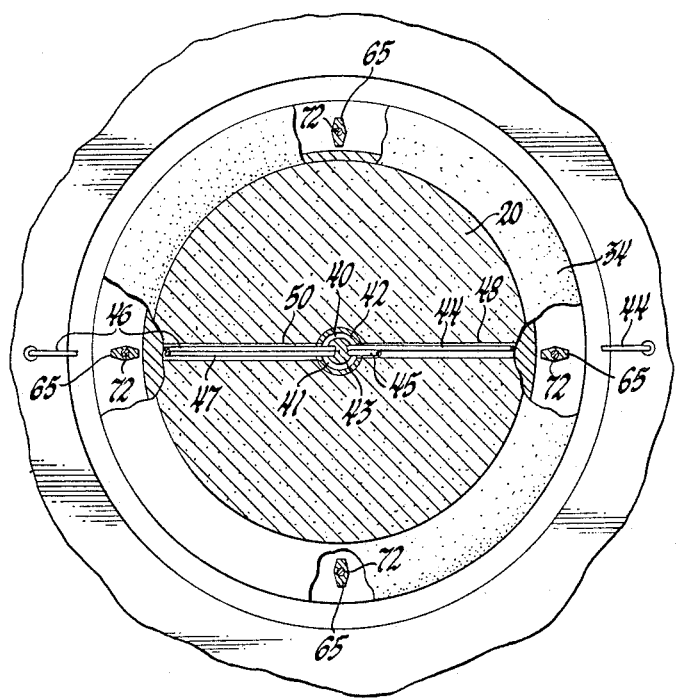
FIGURE 2 is a sectional view taken in the direction of arrows 2—2 in FIGURE 1 with parts broken away.

As mentioned previously another pair of end primers lies behind the pair 40 and 42. This pair of end primers 41 and 43 is connected to an ignition means for the inner annular ring of solid propellant 20 of stage unit 10 by mild detonating fuses 45 and 47 similar to 44 and 46, which lead to the stage separating means. The ignition means for the inner propellant ring 20 comprises a length of pyrocore 62 wrapped in a helix around the inner propellant ring 20. It is noted that this pyrocore ignition line 62 is located in the gas passage 24 and wrapped directly on the inner propellant ring 20. The fuse 45 connects to the upper extremity of the pyrocore 62 and extends thereto through a conduit 49, which is similar to conduits 48 and 50. The fuse 47 extends to the lower end of pyrocore ignitor 62 through the conduit 50. The details of the stage separation and ignition fuse systems can be seen in FIGURES 1 and 2. Thus, when the heat from the combustion of the solid propellant in the stage unit 12 sets off the end primers 40 and 42, it likewise sets off the other pair of end primers 41 and 43 which ignite the fuse leading to the pyrocore igniter 62. The pyrocore igniter 62 then ignites the inner propellant ring 20 which in turn causes the outer propellant ring 18 to be ignited. As a result, the inner propellant ring 20 burns in the radially inward direction and the outer propellant ring 18 burns in the radially outward direction. The exhaust gas from both propellant rings passes through the gas passage 24 to the nozzle structure 26. It is further noted that an annular plug 64 is held within the exit portion 32 of the nozzle 26 by the inner propellant ring of the stage unit 12, and will be blown out upon the ignition of the propellant rings of the stage unit 10 and the passage of the exhaust gases thereof through the nozzle 26. This combination stage-separation and propellant ignition device is completely self-operative and eliminates the need for an electrical ignition system. However, if desirable, an electrical initiator operated by a guidance system could be substituted for the thermal system on a given stage to enable its ignition to be delayed. This would be especially desirable when a period of coasting time is specified in the flight plan of the vehicle.

Figure 4:
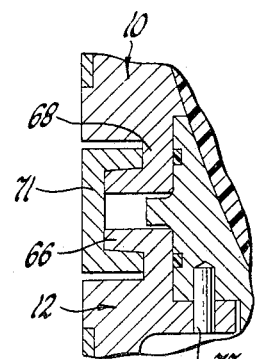
FIGURE 4 is an enlarged sectional view of the clamping mechanism securing the two stages together.

It should be mentioned briefly how two stages are assembled together. Focusing upon the joint between stage units 10 and 12 it is seen that the stage 12 has an upper flange member 66 and that stage unit 10 has a lower flange member 68 which are held together by an annular U-clamp 71. The two stages are further fixed in relation to each other by a series of dowel pins 73. The details of this clamping structure are best seen in FIGURE 4. It is to be noted that the ring of explosive charge 58 is not located at the exact joint of the two stage units; rather, it is positioned on a thin portion of the wall 60 of the stage unit 12. Thus, to assemble the two stage units, the stage 12 is positioned adjacent to the stage unit 10 and in so doing, the central heat passage 22 of stage unit 12 slidingly engages the structural housing around the thermal initiator 38 and the end primers 40 and 42 of stage unit 10. The inner propellant ring of stage unit 12 abuts the exit portion 32 of the nozzle 26 of stage unit 10 and holds the nozzle plug 64 in place, and the end primers 54, which are attached to stage unit 12 by means of flanges 74, make contact with the thermal initiators 52 of stage unit 10. Then the series of dowel pins 73 are fitted to align the stage unit 12 with respect to the stage unit 10, and finally the annular U-clamp 71 is fitted over the flange portions 66 and 68 of stage units 10 and 12, respectively. Thus, as previously mentioned, the plurality of components in the stage separation device are necessary to transfer the explosive reaction through the butt joint between the two stages to the ring of explosive charge 58. Hence it is necessary that the thermal initiators 52 of one stage butt against the end primers 54 of the adjacent stage and that these elements form part of the joint between the two stages.

The remaining structural details of the individual stage units are not felt to be essential to the operation thereof and it should be sufficient to say that they will be made of materials with properties to withstand the operating conditions to which they are subjected.

In summary, then it is seen that the subject invention as described in its preferred embodiment provides a rocket engine stage unit which can be combined with other like stage units of varying sizes and propellant to provide a multitude of combinations resulting in many different multi-stage rocket engines. It has also been shown that one of these stage units, when connected to adjacent stage units will, upon completion of its combustion process, automatically ignite the next stage unit and explosively separate itself from that next stage unit.

The subject invention presents a novel and economical method to standardize the production of multi-stage rockets and missiles to meet the ever-increasing demand for their many varied uses in modern day space exploration and military defense. This is accomplished through the incorporation into each stage unit of the novel, adjustable annular exhaust nozzle and the unique self-operating temperature-responsive stage-separation and ignition system.

Although this invention has been shown and described in its preferred embodiment many modifications may be made thereto without departing from the scope of the invention.

We claim:

1. A rocket engine stage unit adapted to be combined with other like stage units to form a multi-stage solid propellant rocket engine, said stage unit comprising:
   an outer casing;

two annular rings of solid propellant disposed within said casing and separated by a space forming an annular gas passage;
an annular exhaust nozzle located adjacent to said annular gas passage at the lower extremity of said casing, said annular nozzle having a two-piece construction including spacers selectable to determine the throat area of said nozzle at assembly;
heat responsive ignition means including a thermal initiator, end primers ignited by said initiator, and a detonating fuse extending from said end primers to said solid propellant rings;
and an explosive stage separation means to separate an adjacent stage unit from said stage unit when the combustion of said adjacent stage unit nears completion.

2. A rocket engine stage unit adapted to be combined with other like stage units to form a multi-stage solid propellant rocket engine, said stage unit comprising:
an outer casing;
two annular rings of solid propellant disposed within said casing and separated by a space forming an annular gas passage;
an annular exhaust nozzle located adjacent to said annular gas passage at the lower extremity of said casing, said annular nozzle having a two-piece construction including spacers selectable to determine the throat area of said nozzle at assembly;
heat responsive ignition means including a thermal initiator, end primers ignited by said initiator, and a detonating fuse extending from said end primers to said solid propellant rings;
and an explosive stage separation means to separate an adjacent stage unit from said stage unit including a thermal initiator which receives heat from said adjacent stage as it completes combustion, end primers ignited by said initiator, and an annular ring of explosive charge located next to a thin-walled portion of the casing of said adjacent stage, said charge upon ignition explosively disintegrating said thin-walled portion of said casing, and a fuse connecting said end primers and said explosive charge.

3. A set of variable size rocket engine stage units adapted to be combined in a number of combinations, each said variable size stage unit having identical component parts including:
an outer casing;
two annular rings of solid propellant disposed within said casing and separated by a space forming an annular gas passage;
an annular exhaust nozzle located adjacent to said annular gas passage at the lower extremity of said casing, said annular nozzle having a two-piece construction including spacers selectable to determine the throat area of said nozzle at assembly;
heat responsive ignition means including a thermal initiator, end primer ignited by said initiator, and a detonating fuse extending from said end primers to said solid propellant rings;
and an explosive stage separation means to separate an adjacent stage unit from said stage unit when the combustion of said adjacent stage unit nears completion.

4. A set of variable size rocket engine stage units adapted to be combined in a number of combinations, each said variable size stage unit having identical component parts including:
an outer casing;
two annular rings of solid propellant disposed within said casing and separated by a space forming an annular gas passage;
an annular exhaust nozzle located adjacent to said annular gas passage at the lower extremity of said casing, said annular nozzle having a two-piece construction including spacers selectable to determine the throat area of said nozzle of assembly;
heat responsive ignition means including a thermal initiator, end primers ignited by said initiator, and a detonating fuse extending from said end primers to said solid propellant rings;
and an explosive stage separation means to separate an adjacent stage unit from said stage unit including a thermal initiator which receives heat from said adjacent stage as it completes combustion, end primers ignited by said initiator, and an annular ring of explosive charge located next to a thin-walled portion of the casing of said adjacent stage, said charge upon ignition explosively disintegrating said thin-walled portion of said casing, and a fuse connecting said end primers and said explosive charge.

5. A two-piece annular exhaust nozzle for a rocket engine comprising:
a first annular member forming the interior contour of said nozzle;
a second annular member forming the exterior contour of said nozzle;
and a plurality of spacers attaching said first member to said second member, said spacers being selectable to determine the throat area between said first and second members.

References Cited by the Examiner

UNITED STATES PATENTS

| | | | |
|---|---|---|---|
| 1,102,653 | 7/1914 | Goddard | 60—35.6 |
| 2,397,114 | 3/1946 | Anzalone | 102—49 X |
| 2,623,465 | 12/1952 | Jasse | 60—35.6 X |
| 2,695,495 | 11/1954 | Peterman | 60—35.6 |
| 2,850,976 | 9/1958 | Seifert. | |
| 2,876,701 | 3/1959 | Long | 102—20 X |
| 3,026,772 | 3/1962 | Moreland | 102—49 X |
| 3,029,734 | 4/1962 | Allenson | 60—35.6 X |
| 3,062,147 | 11/1062 | Davis et al. | 60—35.6 X |
| 3,088,273 | 5/1963 | Adelman et al. | 60—35.6 |
| 3,107,487 | 10/1963 | Schaafsma | 60—35.6 |
| 3,134,222 | 5/1964 | Maxson | 60—35.6 |
| 3,145,530 | 8/1964 | Sobey | 102—49 X |

FOREIGN PATENTS 158,405   4/1940   Austria.

OTHER REFERENCES

Jet Propulsion, December 1958, page 853, vol. 28, No. 12.

MARK NEWMAN, *Primary Examiner.*

CARLTON R. CROYLE, *Examiner.*